(12) United States Patent
Inaoka

(10) Patent No.: US 8,276,944 B2
(45) Date of Patent: Oct. 2, 2012

(54) EVAPORATED FUEL TREATMENT APPARATUS IN MOTORCYCLE

(75) Inventor: Hiroshi Inaoka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/723,103

(22) Filed: Mar. 12, 2010

(65) Prior Publication Data
US 2010/0243354 A1 Sep. 30, 2010

(30) Foreign Application Priority Data

Mar. 26, 2009 (JP) ................................ 2009-076070

(51) Int. Cl.
*B60K 15/073* (2006.01)
(52) U.S. Cl. ...................................... 280/835; 180/69.4
(58) Field of Classification Search .................. 180/69.4, 180/69.5, 314, 218, 219, 225, 68.3; 280/830, 280/833, 834, 835
See application file for complete search history.

(56) References Cited

U.S. PATENT DOCUMENTS

| | | | | |
|---|---|---|---|---|
| 4,312,649 A * | 1/1982 | Fujii et al. | ........................ | 96/109 |
| 4,646,701 A * | 3/1987 | Fukumoto | ..................... | 123/519 |
| 4,701,198 A * | 10/1987 | Uranishi et al. | ................ | 96/148 |
| 5,868,428 A * | 2/1999 | Ishikawa | ....................... | 280/834 |
| 6,513,613 B2 * | 2/2003 | Suzuki et al. | ................. | 180/227 |
| 6,547,024 B2 * | 4/2003 | Ohyama et al. | .............. | 180/227 |
| 7,472,694 B2 * | 1/2009 | King | ............................. | 123/518 |
| 7,600,506 B2 * | 10/2009 | Kopinsky | ..................... | 123/516 |
| 2003/0132837 A1 * | 7/2003 | Hasegawa et al. | ........... | 340/440 |
| 2006/0060169 A1 * | 3/2006 | Leslie | .......................... | 123/510 |
| 2008/0169148 A1 * | 7/2008 | Beiber Hoeve et al. | ...... | 180/219 |
| 2009/0085342 A1 * | 4/2009 | Chino et al. | .................. | 280/833 |
| 2010/0078241 A1 * | 4/2010 | Maeda et al. | ................ | 180/68.3 |

FOREIGN PATENT DOCUMENTS

JP 4-353257 A 12/1992

\* cited by examiner

*Primary Examiner* — John Walters
*Assistant Examiner* — Brian Swenson
(74) *Attorney, Agent, or Firm* — Westerman, Hattori, Daniels & Adrian, LLP

(57) ABSTRACT

Shorter charge and purge lines are provided in a compactly built motorcycle having an engine disposed downwardly of a rider seat, a fuel tank disposed forwardly of the engine and storing fuel to be supplied to the engine, and a canister adsorbing fuel vapor evaporated in the fuel tank. A fuel tank integrates a tank main portion with a tube portion that joins to a front side upper portion of the tank main portion so as to protrude upwardly of an upper wall of the tank main portion and that has a fuel filler port disposed at an upper end portion thereof. Further, a canister is disposed at a position that is lower than an upper end of the tube portion, rearward of the tube portion, and upward of the tank main portion.

6 Claims, 4 Drawing Sheets

EVAPORATED FUEL TREATMENT APPARATUS IN MOTORCYCLE

TECHNICAL FIELD

The present invention relates, in general, to motorcycles having an engine disposed downwardly of a rider seat so as to develop a drive power for driving a rear wheel, a fuel tank disposed forwardly of the engine and storing fuel to be supplied to the engine, and a canister adsorbing fuel vapor evaporated in the fuel tank and, in particular, to an improved evaporated fuel treatment apparatus.

BACKGROUND OF THE INVENTION

Japanese Patent Laid-open No. Hei 4-353257 discloses a scooter type motorcycle, in which a canister that adsorbs fuel vapor evaporated in a fuel tank is disposed rearwardly of a helmet storage box disposed downwardly of a rider seat and displaced in a vehicle width direction from an upper portion of a rear cushion.

SUMMARY OF THE INVENTION

Typically, the canister is charged with fuel vapor evaporated in the fuel tank while the engine is stationary and fuel adsorbed by the canister is evaporated and purged to the engine side while the engine is activated. There is a need for shortening a charge line and a purge line, while building an even more compact motorcycle.

The present invention provides an evaporated fuel treatment apparatus in a motorcycle achieving shorter charge and purge lines and a compactly built motorcycle.

An evaporated fuel treatment apparatus for a motorcycle is provided, the motorcycle including: an engine disposed downward of a rider seat so as to develop a drive power for driving a rear wheel; a fuel tank disposed forward of the engine, the fuel tank storing fuel to be supplied to the engine; and a canister adsorbing fuel vapor generated in the fuel tank. The motorcycle is characterized firstly in that: the fuel tank integrally includes: a tank main portion; and a tube portion that joins to a front side upper portion of the tank main portion so as to protrude upward from an upper wall of the tank main portion, the tube portion including a fuel filler port disposed at an upper end portion thereof; and the canister is disposed at a position that is lower than the upper end of the tube portion, rearward of the tube portion, and upward of the tank main portion.

The motorcycle is characterized secondly by further including, in addition to the arrangement of the first characteristic of the motorcycle, a fuel pump disposed on the upper wall of the tank main portion, rearward of the tube portion, the fuel pump supplying the engine with fuel in the fuel tank.

The motorcycle is characterized thirdly by further including, in addition to the arrangement of the first or second characteristic of the motorcycle, a purge control valve disposed at a position that is lower than the upper end of the tube portion, rearward of the tube portion, and upward of the tank main portion, the purge control valve controlling purging of the fuel vapor from the canister to the engine.

The motorcycle is characterized fourthly in that, in addition to the arrangement of the third characteristic of the motorcycle, the purge control valve includes a solenoid valve.

Additionally, the motorcycle is characterized fifthly in that, in addition to the arrangement of any of the first to fourth characteristics of the motorcycle, the motorcycle further includes a floor tunnel portion included in a vehicle body cover and disposed at a position lower than an upper surface of the rider seat so as to form upwardly a stride space through which a rider moves his or her foot during ingress/egress. In this arrangement, the fuel tank is disposed inside the floor tunnel portion.

According to the first characteristic of the motorcycle, the fuel tank integrates the tank main portion with the tube portion that joins to the front side upper portion of the tank main portion so as to protrude upward of the upper wall of the tank main portion and has the fuel filler port disposed at the upper end portion thereof. Further, the canister is disposed at a position that is lower than the upper end of the tube portion, rearward of the tube portion, and upward of the tank main portion. Thus, the canister is disposed between the fuel filler port of the fuel tank and the engine, so that a charge line and a purge line can be shortened.

According to the second characteristic of the motorcycle, the fuel pump is mounted on the upper wall of the tank main portion, rearward of the tube portion, so that the fuel pump can be built compactly, while achieving a sufficient capacity of the fuel tank.

According to the third characteristic of the motorcycle, the purge control valve is disposed at a position lower than the upper end of the tube portion, rearward of the tube portion, and upward of the tank main portion. The purge control valve can therefore be disposed by making effective use of a space produced upward of the tank main portion in the fuel tank.

According to the fourth characteristic of the motorcycle, the purge control valve as a solenoid valve can be disposed close to the fuel pump. This helps keep harnesses compact.

Additionally according to the fifth characteristic of the motorcycle, the fuel tank is disposed inside the floor tunnel portion that is included in the vehicle body cover and disposed at a position lower than the upper surface of the rider seat so as to form upwardly the stride space. The canister is disposed at a position lower than an upper end of the tube portion in the fuel tank despite the fact that the canister is disposed upwardly of the fuel tank to achieve shorter charge and purge lines. This allows an upper edge of the floor tunnel portion to be disposed as low as possible relative to the upper surface of the rider seat for better ingress/egress.

BRIEF DESCRIPTION OF THE DRAWINGS

The advantages of the invention will become apparent in the following description taken in conjunction with the drawings, wherein.

DETAILED DESCRIPTION OF THE INVENTION

A specific embodiment to which the present invention is applied will be described below with reference to the accompanying drawings.

Figure 1:
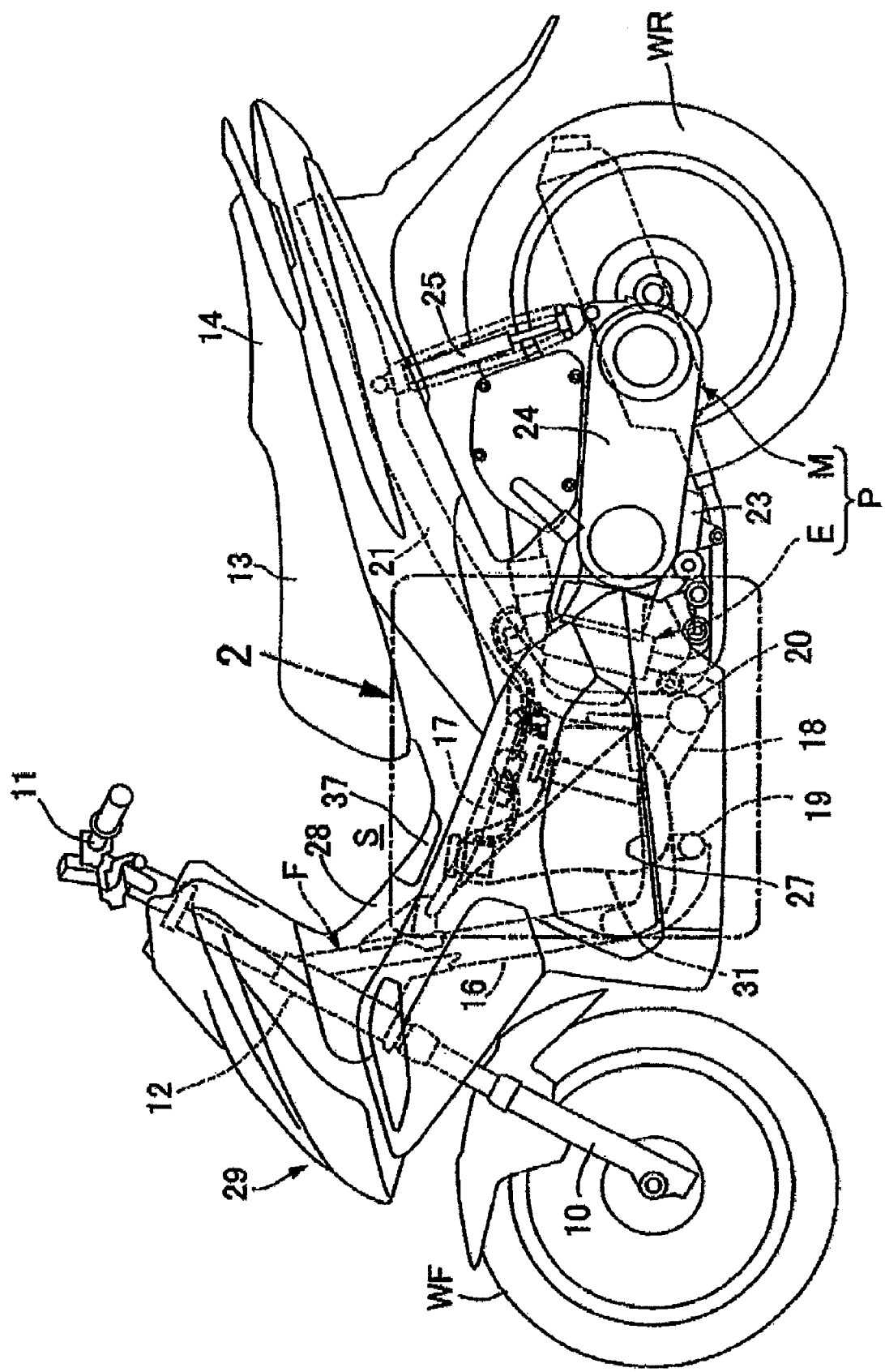
FIG. 1 is a left side elevational view showing a motorcycle.

A first embodiment of the present invention will be described below with reference to FIGS. 1 through 4. Referring first to FIG. 1, a scooter type vehicle includes a vehicle body frame F. The vehicle body frame F includes a head pipe 12 disposed at a front end thereof. The head pipe 12 supports a front fork 10 that journals a front wheel WF and a steering handlebar 11 connected to the front fork 10. A power unit P having a rear end supporting a rear wheel WR is vertically swingably supported at an intermediate portion in a longitudinal direction of the vehicle body frame F. A rider seat 13 and a passenger seat 14 disposed rearwardly of the rider seat 13 are disposed at a rear portion of the vehicle body frame F.

Figure 2:
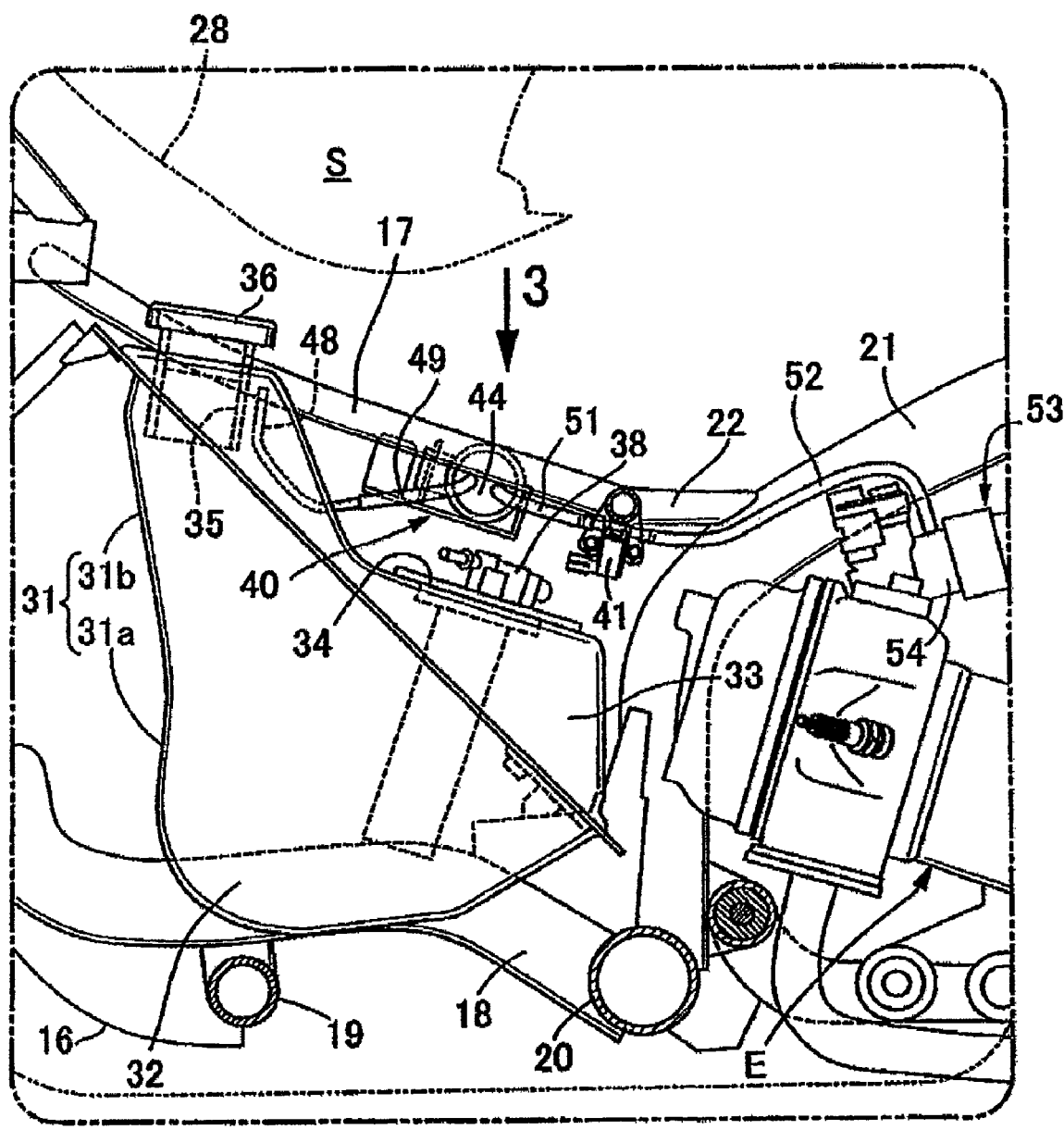
FIG. 2 is a longitudinal cross-sectional view on arrow 2 of FIG. 1.

Referring also to FIG. 2, the vehicle body frame F includes the head pipe 12, a single down tube 16, a pair of left and right center frames 17, a pair of left and right lower frames 18, a front portion cross pipe 19, a rear portion cross pipe 20, a pair of left and right rear frame pipes 21, and an upper portion cross pipe 22. Specifically, the down tube 16 droops to face rearwardly from the head pipe 12. The center frames 17 have front ends connected to the head pipe 12 so as to extend downwardly toward the rear, upwardly of the down tube 16. The lower frames 18 are connected to a lower portion of the down tube 16 and extend rearwardly. The front portion cross pipe 19 connects between intermediate portions of the lower frames 18. The down tube 16 has a rear end connected in a row arrangement to a center portion of the front portion cross pipe 19. The rear portion cross pipe 20 connects between rear end portions of the lower frames 18. The rear frame pipes 21 have front ends connected in a row arrangement to rear portions of the lower frames 18 and extend upwardly toward the rear. The upper portion cross pipe 22 connects between intermediate portions on the side of front portions of the rear frame pipes 21 and bulges forwardly substantially into a U shape. The center frames 17 have rear ends connected in a row arrangement to a center portion of the upper portion cross pipe 22.

The power unit P includes an engine E and a transmission system M. Specifically, the engine E is disposed forwardly of the rear wheel WR and between the front portions of the rear frame pipes 21 in the vehicle body frame F. The transmission system M is disposed on the left side of the rear wheel WR. The transmission system M is connected in a row arrangement to a crankcase 23 of the engine E and housed in a transmission case 24 that extends along the left side of the rear wheel WR. A rear cushion unit 25 is disposed between a rear portion of the transmission case 24 and the left rear frame pipe 21 of the pair of left and right rear frame pipes 21.

In addition, the vehicle body frame F and part of the power unit P are covered in a vehicle body cover 29. The vehicle body cover 29 includes a pair of left and right footrest portions 27 and a floor tunnel portion 28 and is mounted on the vehicle body frame F. Specifically, the footrest portions 27 are supported by the lower frames 18 so as to support feet of the rider sitting in the rider seat 13 placed thereon. The floor tunnel portion 28 bulges upwardly between the footrest portions 27 and is disposed at a position lower than an upper surface of the rider seat 13 so as to form upwardly a stride space S.

A fuel tank 31 that stores therein fuel to be supplied to the engine E is disposed forwardly of the engine E and inside the floor tunnel portion 28. The fuel tank 31 is formed to include a lower portion tank half body 32 that opens upwardly and an upper portion tank half body 33 that opens downwardly, the lower portion tank half body 32 and the upper portion tank half body 33 being connected together. The fuel tank 31 integrates a tank main portion 31a with a tube portion 31b. The tube portion 31b joins to a front side upper portion of the tank main portion 31a so as to protrude upwardly of an upper wall 34 of the tank main portion 31a.

The tube portion 31b includes a fuel filler port 35 disposed at an upper end portion thereof. The fuel filler port 35 is closed by a filler cap 36. A lid 37 is openably mounted on the floor tunnel portion 28 in the vehicle body cover 29, correspondingly to the fuel filler port 35.

A fuel pump 38 that supplies the side of the engine E with fuel in the fuel tank 31 is mounted on the upper wall 34 of the tank main portion 31a in the fuel tank 31 so as to be disposed rearwardly of the tube portion 31b. In addition, a canister 40 and a purge control valve 41 are disposed at positions lower than an upper end of the tube portion 31b, rearward of the tube portion 31b, and upward of the tank main portion 31a. The canister 40 adsorbs fuel vapor evaporated in the fuel tank 31. The purge control valve 41 controls purging of the fuel vapor from the canister 40 to the side of the engine E.

Figure 3:
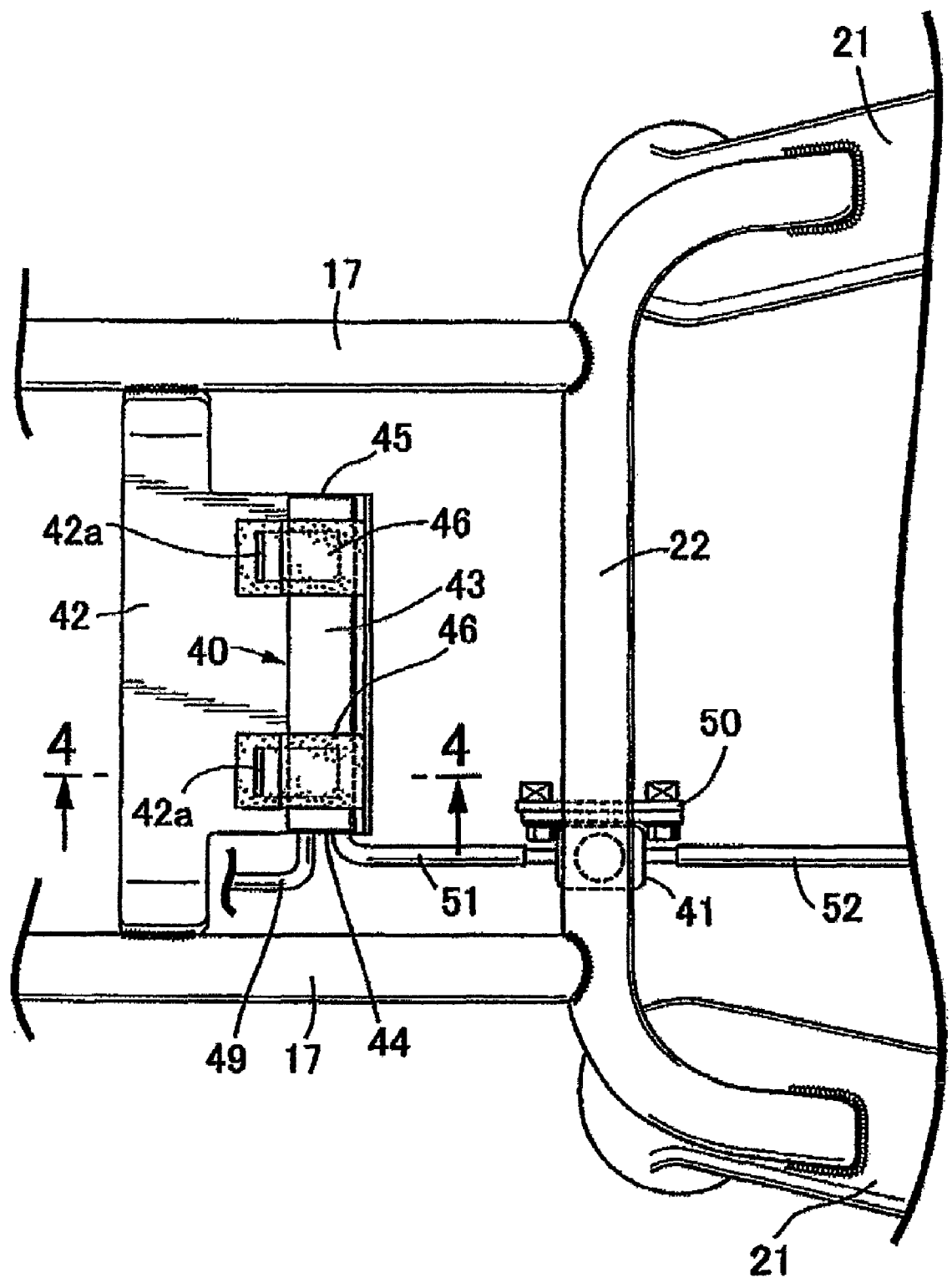
FIG. 3 is a view on arrow 3 of FIG. 2.
Figure 4:
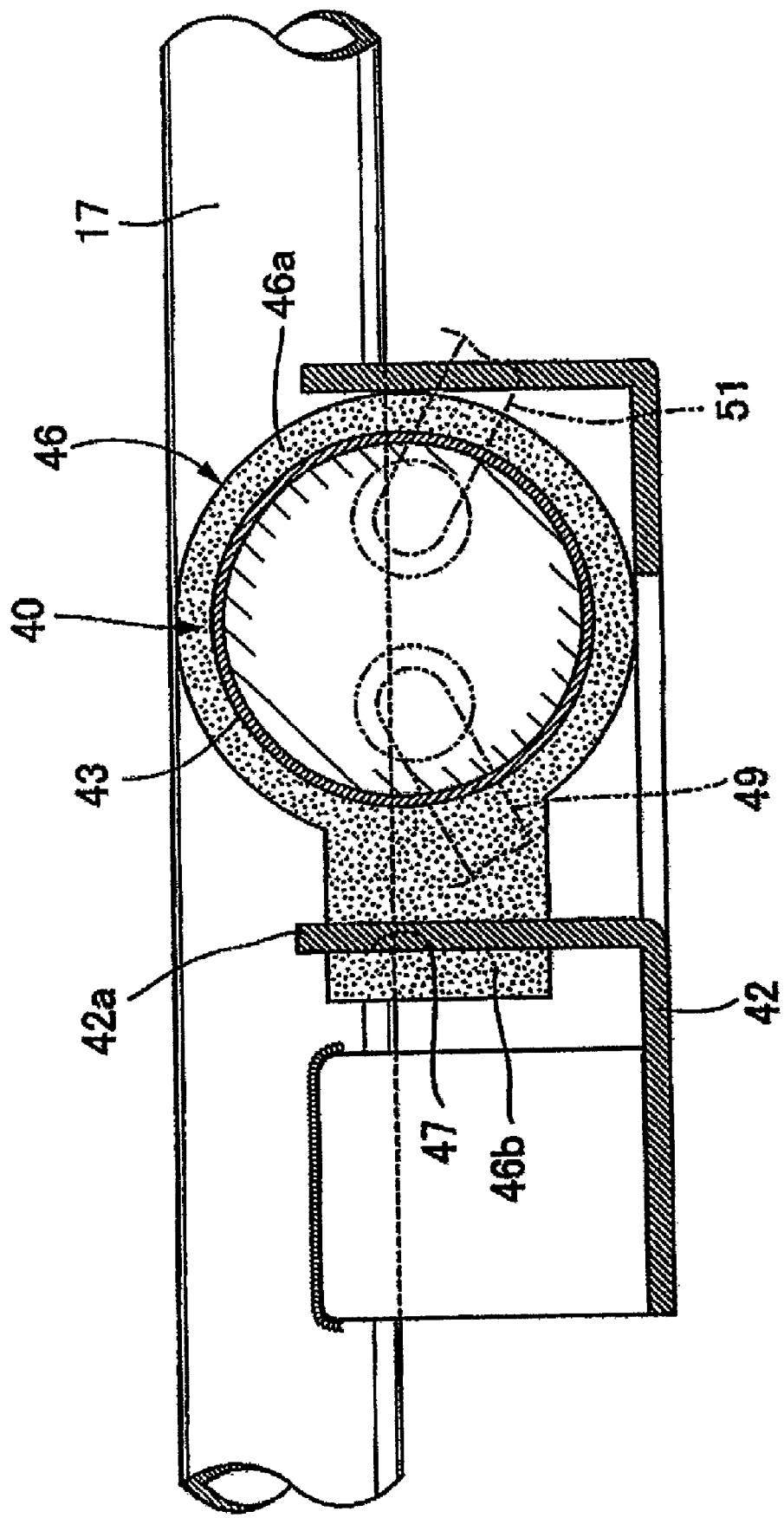
FIG. 4 is a cross-sectional view taken along line 4-4 of FIG. 3.

Referring also to FIGS. 3 and 4, a stay 42 is disposed between the center frames 17 of the vehicle body frame F, rearwardly of the tube portion 31b in the fuel tank 31. The canister 40 is supported on the stay 42.

A case 43 for the canister 40 is formed into a cylinder extending in a vehicle width direction and having both ends closed by end walls 44, 45. The case 43 of the canister 40 includes a pair of engagement members 46. These engagement members 46 are engaged with a pair of lock tabs 42a disposed on the stay 42, which results in the canister 40 being fixedly retained on the stay 42.

Each of the engagement members 46 is formed of an elastic material, for example, rubber, integrating an annular portion 46a and an engagement protrusion portion 46b protruding outwardly from the annular portion 46a. The annular portion 46a is resiliently mounted on an outer periphery of the case 43 in the canister 40. The engagement protrusion portion 46b includes an engagement hole 47 formed therein. An upper portion of the lock tab 42a is passed through and engaged with the engagement hole 47.

A charge pipe 48 made of metal is disposed at the tube portion 31b in the fuel tank 31. The charge pipe 48 has a first end open to the inside of the tube portion 31b near the fuel filler port 35 and penetrates through a rear wall of the tube portion 31b to protrude rearwardly. The charge pipe 48 has a second end to which a first end portion of a charge hose 49 for deriving the fuel vapor evaporated in the fuel tank 31 is connected. Additionally, the charge hose 49 has a second end connected to the left end wall 44 of the end walls 44, 45 of the case 43 in the canister 40. The foregoing arrangements allow the fuel vapor evaporated in the fuel tank 31 to be trapped by the canister 40.

Additionally, a stay 50 is fixedly attached to the upper portion cross pipe 22 of the vehicle body frame F, rearwardly of the stay 42. The purge control valve 41 is mounted on the stay 50. The purge control valve 41 is a solenoid valve that is closed when the engine E is cool or during idle operation and opens when the engine E is hot.

A first purge hose 51 for drawing the fuel vapor trapped by the canister 40 has a first end portion connected to the left end wall 44 in the canister 40. The first purge hose 51 has a second end portion connected to the purge control valve 41. In addition, a second purge hose 52 has a first end portion connected to the purge control valve 41 and a second end portion connected to an intake pipe 54 in an intake system 53 of the engine E. Accordingly, the fuel vapor trapped by the canister 40 is drawn from the canister 40 by a vacuum in the intake system 53 while the engine E is hot and supplied to the engine E from the intake pipe 54 of the intake system 53 by way of the first purge hose 51, the purge control valve 41, and the second purge hose 52.

A pressure release tube (not shown) for making the canister 40 open to the atmosphere and a drain tube (not shown) for discharging drain from the canister 40 are connected to the right end wall 45 of the two end walls 44, 45 in the case 43 of the canister 40.

Effects of the first embodiment of the present invention will be described below. The fuel tank 31 integrates the tank main portion 31a with the tube portion 31b that joins to the front side upper portion of the tank main portion 31a so as to protrude upwardly of the upper wall 34 of the tank main portion 31a and has the fuel filler port 35 disposed at the upper end portion thereof. Further, the canister 40 is disposed at a position that is lower than the upper end of the tube portion 31b, rearward of the tube portion 31b, and upward of the tank main portion 31a. Thus, the canister 40 is disposed between the fuel filler port 35 of the fuel tank 31 and the engine E, so that a charge line and a purge line can be shortened.

Additionally, the fuel pump 38 is mounted on the upper wall 34 of the tank main portion 31a, rearwardly of the tube portion 31b, so that the fuel pump 38 can be built compactly, while achieving a sufficient capacity of the fuel tank 31.

The purge control valve 41 that controls purging of the fuel vapor from the canister 40 to the side of the engine E is disposed at a position lower than the upper end of the tube portion 31b, rearward of the tube portion 31b, and upward of the tank main portion 31a. The purge control valve 41 can therefore be disposed by making effective use of a space produced upwardly of the tank main portion 31a in the fuel tank 31.

Moreover, the purge control valve 41 is a solenoid valve, so that the purge control valve 41 can be disposed close to the fuel pump 38. This helps keep harnesses compact.

Additionally, the fuel tank 31 is disposed inside the floor tunnel portion 28 that is included in the vehicle body cover 29 and disposed at a position lower than the upper surface of the rider seat 13 so as to form upwardly the stride space S through which the rider moves his or her foot during ingress/egress. The canister 40 is disposed at a position lower than the tube portion 31b in the fuel tank 31 despite the fact that the canister 40 is disposed upwardly of the fuel tank 31 to achieve shorter charge and purge lines. This allows the upper edge of the floor tunnel portion 28 to be disposed as lower as possible than the upper surface of the rider seat 13 for better ingress/egress.

While the present invention has been particularly shown and described with reference to a preferred embodiment, it should be understood that the present invention is not limited to the disclosed embodiment. It will be understood by those skilled in the art that various changes in form and detail may be made therein without departing from the spirit and scope of the invention.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A motorcycle, comprising:
   an engine disposed downward of a rider seat;
   a fuel tank disposed forward of said engine, said fuel tank storing fuel to be supplied to said engine; and
   a canister adsorbing fuel vapor generated in said fuel tank,
   wherein the fuel tank integrally includes
       a tank main portion, and
       a tube portion joined to a front side upper portion of said tank main portion so as to protrude upwardly from an upper wall of said tank main portion, said tube portion including a fuel filler port disposed at an upper end portion thereof, and
   wherein said canister is disposed at a position lower than said upper end of said tube portion, rearward of said tube portion, and upward of said tank main portion,
   wherein said motorcycle further comprises a fuel pump disposed on said upper wall of said tank main portion, rearward of said tube portion, said fuel pump supplying said engine with fuel from said fuel tank, and
   wherein, when viewed from a horizontal direction, at least part of said canister and at least part of said fuel pump are disposed on a vertical line perpendicular to the front-rear direction of the motorcycle.

2. The motorcycle according to claim 1, further comprising:
   a purge control valve disposed at a position lower than said upper end of said tube portion, rearward of said tube portion, and upward of said tank main portion, said purge control valve controlling purging of the fuel vapor from said canister to said engine.

3. The motorcycle according to claim 2, wherein said purge control valve includes a solenoid valve.

4. The motorcycle according to claim 3, further comprising:
   a floor tunnel portion included in a vehicle body cover and disposed at a position lower than an upper surface of said rider seat so as to form upwardly a space through which a rider moves his or her foot during ingress/egress,
   wherein said fuel tank is disposed inside said floor tunnel portion.

5. The motorcycle according to claim 2, further comprising:
   a floor tunnel portion included in a vehicle body cover and disposed at a position lower than an upper surface of said rider seat so as to form upwardly a space through which a rider moves his or her foot during ingress/egress,
   wherein said fuel tank is disposed inside said floor tunnel portion.

6. The motorcycle according to claim 1, further comprising:
   a floor tunnel portion included in a vehicle body cover and disposed at a position lower than an upper surface of said rider seat so as to form upwardly a space through which a rider moves his or her foot during ingress/egress,
   wherein said fuel tank is disposed inside said floor tunnel portion.

* * * * *